United States Patent
Sheehan

(10) Patent No.: US 7,979,470 B2
(45) Date of Patent: Jul. 12, 2011

(54) DATA MANIPULATION PROCESS METHOD AND SYSTEM

(75) Inventor: Alexander Brantley Sheehan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 12/050,977

(22) Filed: Mar. 19, 2008

(65) Prior Publication Data

US 2009/0240727 A1 Sep. 24, 2009

(51) Int. Cl.
*G06F 17/30* (2006.01)

(52) U.S. Cl. .......................... 707/791; 707/955

(58) Field of Classification Search ............... 707/756, 707/791, 955; 719/315
See application file for complete search history.

(56) References Cited

U.S. PATENT DOCUMENTS

| | | | | |
|---|---|---|---|---|
| 5,073,963 | A * | 12/1991 | Sammons et al. | 382/128 |
| 6,418,448 | B1 * | 7/2002 | Sarkar | 1/1 |
| 6,463,442 | B1 * | 10/2002 | Bent et al. | 719/332 |
| 6,507,898 | B1 * | 1/2003 | Gibson et al. | 711/168 |
| 6,674,536 | B2 * | 1/2004 | Long et al. | 358/1.15 |
| 6,707,463 | B1 * | 3/2004 | Gibson et al. | 345/619 |
| 2002/0026524 | A1 * | 2/2002 | Dharap | 709/236 |
| 2002/0033837 | A1 * | 3/2002 | Munro | 345/654 |
| 2002/0090956 | A1 * | 7/2002 | Otsuka et al. | 455/456 |
| 2003/0097361 | A1 * | 5/2003 | Huang et al. | 707/10 |
| 2003/0109940 | A1 * | 6/2003 | Guntzer et al. | 700/52 |
| 2005/0026131 | A1 * | 2/2005 | Elzinga et al. | 434/365 |
| 2005/0044145 | A1 * | 2/2005 | Quinn et al. | 709/205 |
| 2005/0134913 | A1 * | 6/2005 | Ha | 358/1.15 |
| 2006/0218156 | A1 * | 9/2006 | Schechinger et al. | 707/100 |
| 2009/0033656 | A1 * | 2/2009 | Larkins et al. | 345/419 |
| 2009/0198780 | A1 * | 8/2009 | Koch | 709/206 |
| 2010/0005025 | A1 * | 1/2010 | Kumar et al. | 705/40 |

OTHER PUBLICATIONS

Chris Fehily, SQL: Visual QuickStart Guide, Peachpit Press, Jul. 19, 2002.*

* cited by examiner

*Primary Examiner* — John R. Cottingham
*Assistant Examiner* — Alexandria Y Bromell
(74) *Attorney, Agent, or Firm* — Schmeiser, Olsen & Watts; John R. Pivnichny

(57) ABSTRACT

A data manipulation method and system. The method includes receiving by a computing system, a multiple data manipulation (MDM) list comprising data objects. The computing system includes a memory unit that comprises data. A data object of the data objects is reviewed. The computing system determines that a new item attribute for the data object comprises a value of null. The computing system determines that an original item attribute for the data object comprises a value of not null. The computing system generates and transmits to DELETE request command to the memory unit. The computing system deletes in response to the delete request command, a first portion of the data.

16 Claims, 8 Drawing Sheets

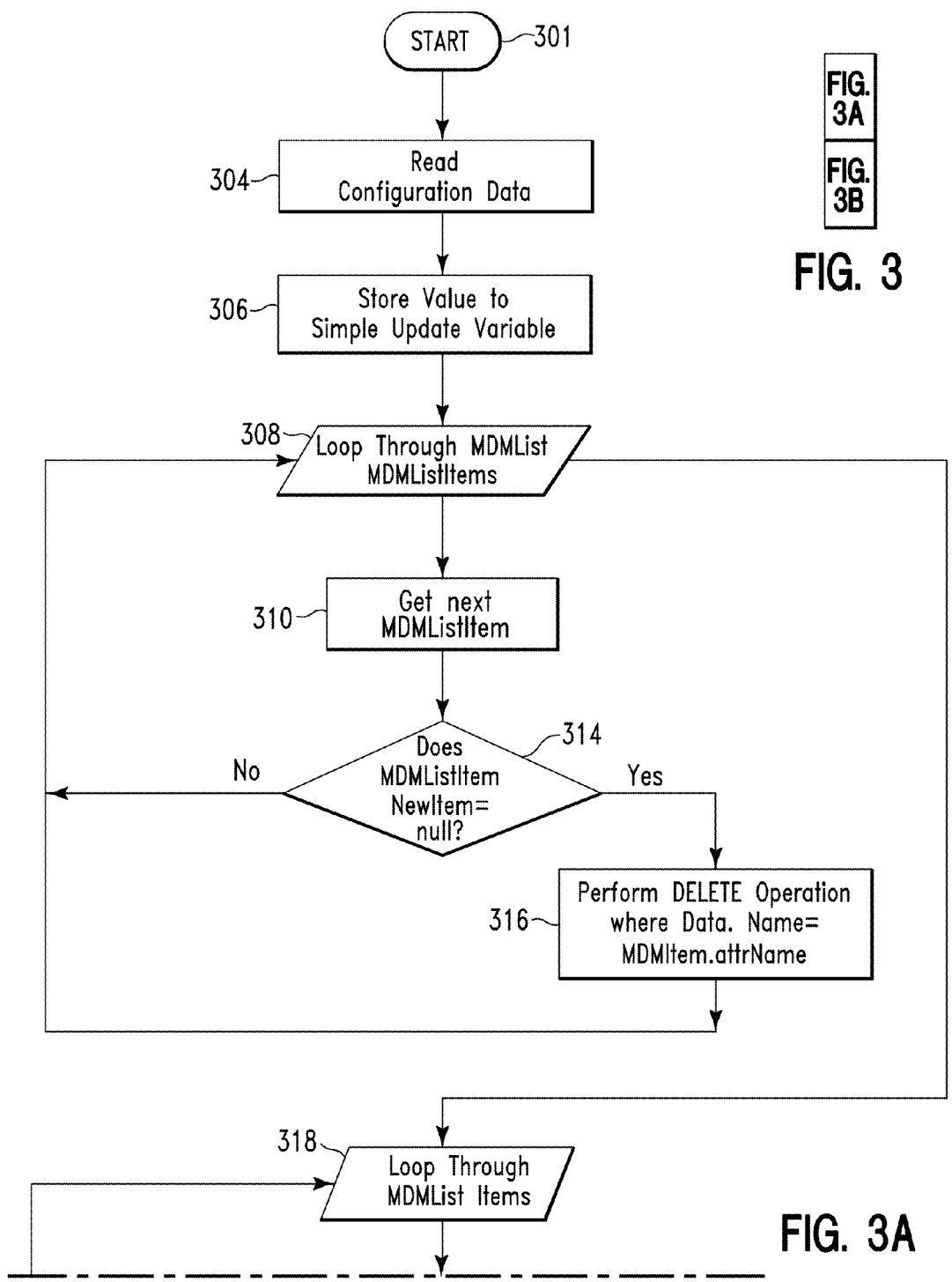

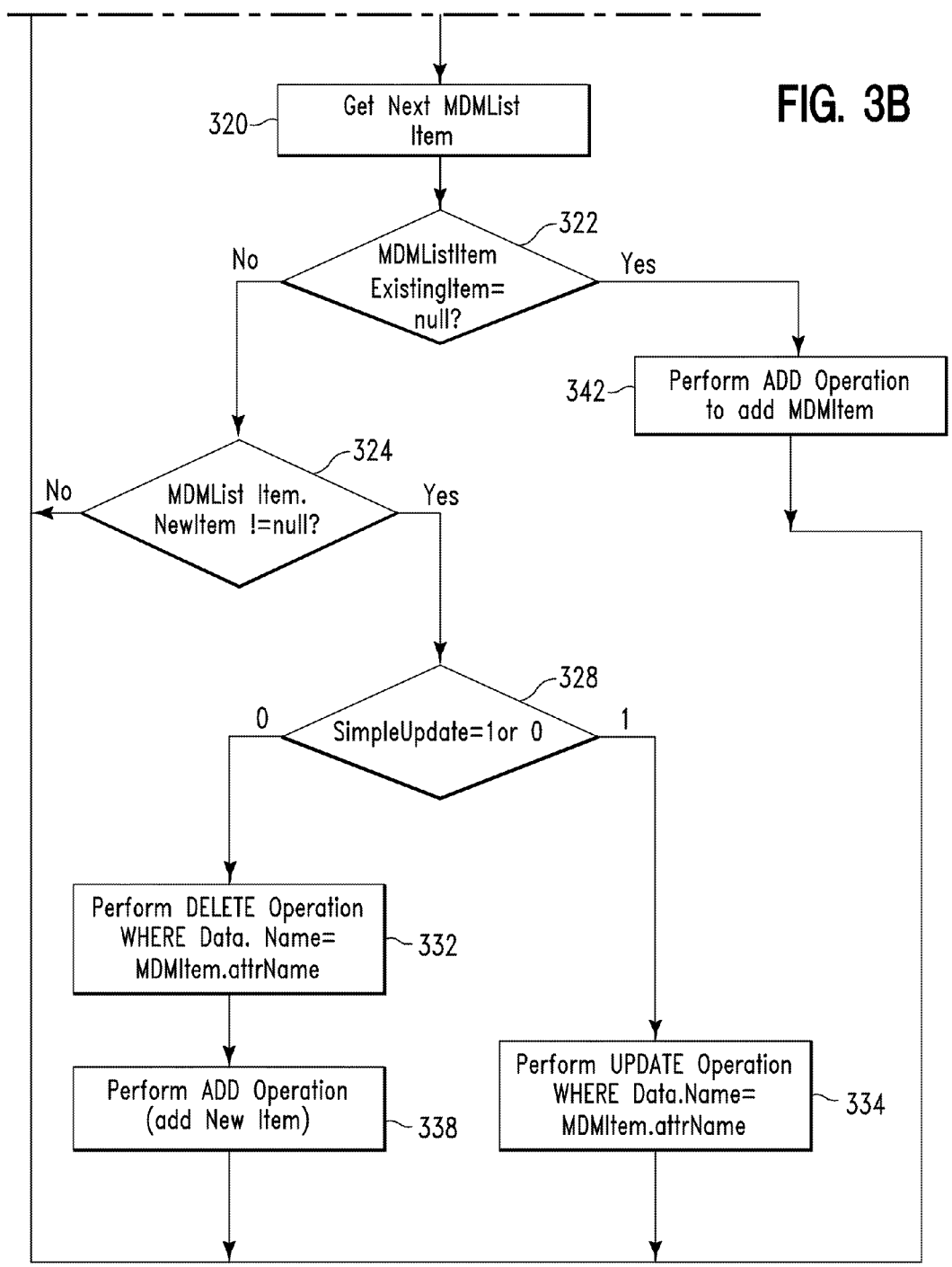

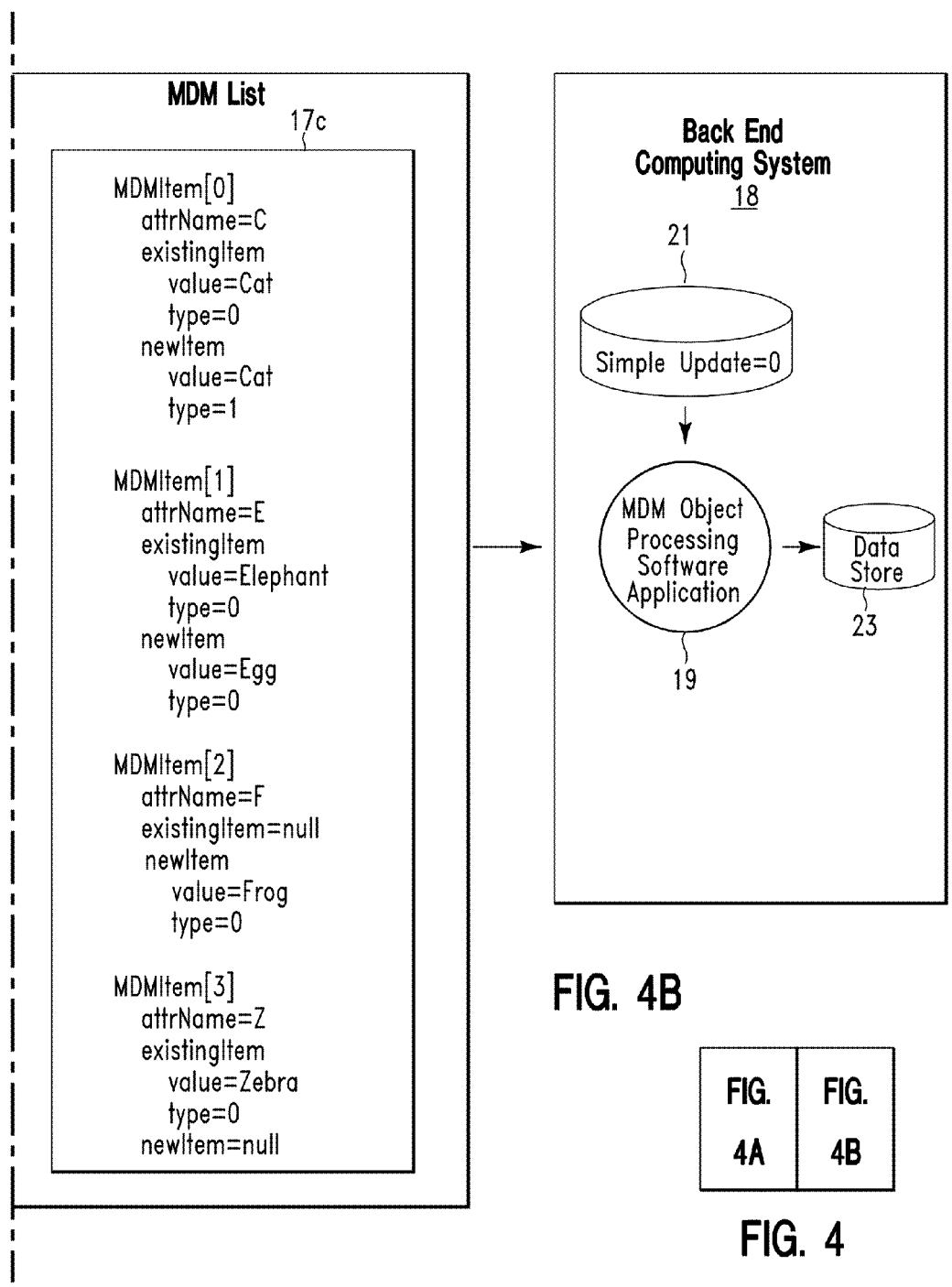

US 7,979,470 B2

DATA MANIPULATION PROCESS METHOD AND SYSTEM

FIELD OF THE INVENTION

The present invention relates to a method and associated system for processing data manipulation commands.

BACKGROUND OF THE INVENTION

Modifying data in systems typically comprises an inefficient process with little flexibility. Accordingly, there exists a need in the art to overcome at least some of the deficiencies and limitations described herein above.

SUMMARY OF THE INVENTION

The present invention provides data manipulation method comprising:

receiving, by a computing system, a multiple data manipulation (MDM) list, wherein said computing system comprises a memory system, wherein said memory system comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;

reviewing, by said computing system, a first data object of said data objects;

storing, by said computing system, all attribute values of said first data object in a first data object variable;

determining, by said computing system, that a new item attribute for said first data object variable comprises an attribute value of null;

determining, by said computing system, that an original item attribute for said first data object variable comprises an attribute value of not null;

generating, by said computing system, a first DELETE request command;

transmitting, by said computing system, said first DELETE request command to said memory system; and deleting in response to first delete request command, by said computing system, a first portion of said data, wherein said first portion of data is associated with a first name attribute comprised by said first data object variable.

The present invention provides a computing system comprising a processor coupled to a computer-readable memory unit, said memory unit comprising instructions that when executed by the processor implements a data manipulation method, said method comprising:

receiving, by said computing system, a multiple data manipulation (MDM) list, wherein said memory unit comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;

reviewing, by said computing system, a first data object of said data objects;

storing, by said computing system, all attribute values of said first data object in a first data object variable;

determining, by said computing system, that a new item attribute for said first data object variable comprises an attribute value of null;

determining, by said computing system, that an original item attribute for said first data object variable comprises an attribute value of not null;

generating, by said computing system, a first DELETE request command;

transmitting, by said computing system, said first DELETE request command to said memory system; and deleting in response to first delete request command, by said computing system, a first portion of said data, wherein said first portion of data is associated with a first name attribute comprised by said first data object variable.

The present invention provides a computer program product, comprising a computer readable medium comprising a computer readable program code embodied therein, said computer readable program code adapted to implement a data manipulation method within a computing system comprising said computer readable medium, said method comprising:

receiving, by said computing system, a multiple data manipulation (MDM) list, wherein said computer readable medium comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;

reviewing, by said computing system, a first data object of said data objects;

storing, by said computing system, all attribute values of said first data object in a first data object variable;

determining, by said computing system, that a new item attribute for said first data object variable comprises an attribute value of null;

determining, by said computing system, that an original item attribute for said first data object variable comprises an attribute value of not null;

generating, by said computing system, a first DELETE request command;

transmitting, by said computing system, said first DELETE request command to said memory system; and deleting in response to first delete request command, by said computing system, a first portion of said data, wherein said first portion of data is associated with a first name attribute comprised by said first data object variable.

The present invention provides a process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing a data manipulation method, said method comprising:

receiving, by said computing system, a multiple data manipulation (MDM) list, wherein said memory unit comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;

reviewing, by said computing system, a first data object of said data objects;

storing, by said computing system, all attribute values of said first data object in a first data object variable;

determining, by said computing system, that a new item attribute for said first data object variable comprises an attribute value of null;

determining, by said computing system, that an original item attribute for said first data object variable comprises an attribute value of not null;

generating, by said computing system, a first DELETE request command;

transmitting, by said computing system, said first DELETE request command to said memory system; and deleting in response to first delete request command, by said computing system, a first portion of said data, wherein said first portion of data is associated with a first name attribute comprised by said first data object variable.

The present invention advantageously provides a simple method and associated system capable of modifying in systems.

BRIEF DESCRIPTION OF THE DRAWINGS

FIG. 3 which includes FIGS. 3A and 3B illustrates a flowchart describing an algorithm used by the system of FIG. 1 for processing multiple data manipulation operations, in accordance with embodiments of the present invention.

FIG. 4 which includes FIGS. 4A and 4B illustrates a component diagram describing a usage process for implementing the algorithms of FIGS. 2 and 3 for generating and processing multiple data manipulation operations, in accordance with embodiments of the present invention.

DETAILED DESCRIPTION OF THE INVENTION

Figure 1:
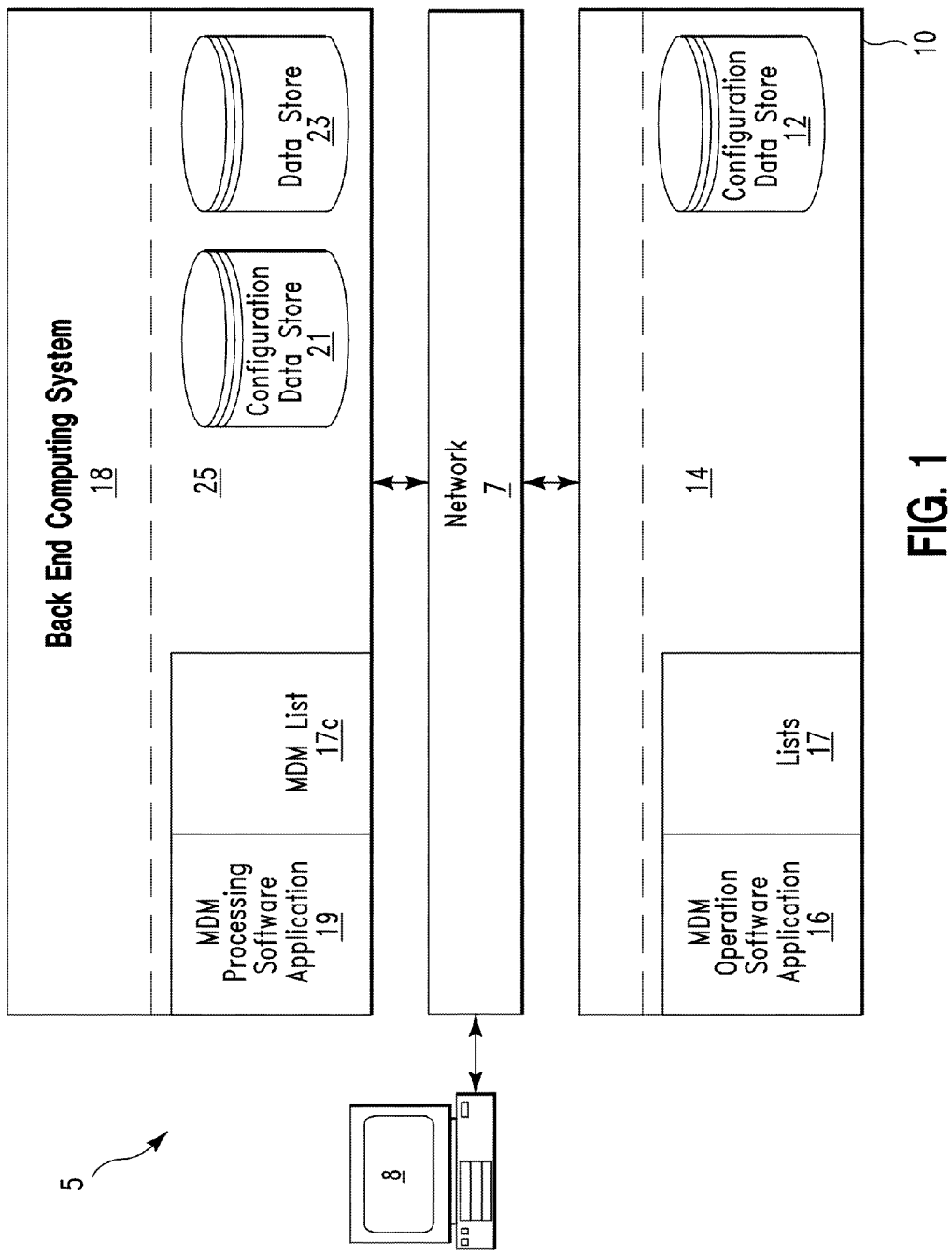
FIG. 1 illustrates a system 5 for generating and processing multiple data manipulation operations, in accordance with embodiments of the present invention.

FIG. 1 illustrates a system 5 for generating and processing multiple data manipulation operations (commands), in accordance with embodiments of the present invention. System 5 of FIG. 1 comprises a computing apparatus 8 and a back end computing system 18 connected to a front end computing system 10 through a network 7. Network 7 may comprise any type of network including, inter alia, a local area network (LAN), a wide area network (WAN), the Internet, etc. Back end computing system 18 may comprise any type of computing system(s) including, inter alia, a personal computer (PC), a server computer, a database computer, etc. Front end computing system 10 may comprise any type of computing system(s) including, inter alia, a personal computer (PC), a server computer, a database computer, etc. Front end computing system 10 is used to retrieve an original list of data items, make changes which result in a new list of data items, and generate a multiple data manipulation list that is subsequently sent to back end computing system 18 for processing. Front end computing system 10 comprises a memory system 14 (e.g., an application server). Memory system 14 may comprise a single memory system (e.g., a single application server). Alternatively, memory system 14 may comprise a plurality of memory systems (e.g., multiple application servers). Memory system 14 comprises a multiple data manipulation operation software application 16, lists 17 (e.g., a multiple data manipulation list as described with reference to FIGS. 2 and 3, infra), and a configuration data store 12. Configuration data store 12 comprises configuration data used for generating a multiple data manipulation list. Computing apparatus 8 may comprise, inter alia, a personal computer, a laptop computer, a computer terminal, etc. Computing apparatus 8 may comprise a single computing apparatus or a plurality of computing apparatuses. Computing apparatus 8 is used by users (e.g., user 8a in FIG. 3 as described, infra) for generating and updating lists 17.

Multiple data manipulation operation software application 16 is used to generate a multiple data manipulation operation list. The following process steps illustrate a multiple data manipulation operation generation process performed by front end computing system 10:

1. Front end computing system 10 receives a first list comprising a first group of data objects. Each data object of the first group of data objects includes attributes. Each attribute includes an attribute value. For example an attribute (e.g., name) may comprise a value of C.
2. The first list is stored with lists 17 in memory system 14.
3. Front end computing system 10 receives configuration data.
4. The configuration data is stored in memory system 14.
5. Front end computing system 10 generates (i.e., in response to a command from a user via computing apparatus 8) a second list associated with the first list. The second list comprises a second group of data objects associated with the first group of data objects. Each data object of the second group of data objects includes attributes (i.e., same attributes as the attributes each data object of the first group of data objects). Each attribute for the second group of data objects includes an attribute value. The attribute values for the attributes associated with the second group of data objects may comprise different attributes values from the attribute values for the attributes associated with the first group of data objects. For example, an attribute (e.g., name) associated with the first group of data objects may comprise a value of C and an attribute (e.g., name) associated with the second group of data objects may comprise a value of D.
6. Front end computing system 10 compares each data object of the first group of data objects to an associated data object of the second group of data objects to determine if any attribute values associated with the attributes comprised by the first group of data objects are the same or different from any associated attribute values associated with the attributes comprised by the second group of data objects.
7. Front end computing system 10 retrieves the configuration data from configuration data store 12.
8. Front end computing system 10 generates (i.e., based on the comparing from step 6 and the configuration data) a multiple data manipulation operation list. The multiple data manipulation operation list includes a third group of data objects associated with the first group of data objects and the second group of data objects.

9. Front end computing system 10 stores the multiple data manipulation operation list.
10. Front end computing system 10 transmits the multiple data manipulation operation list to back end computing system 18 for processing (i.e., for modifying data). Back-end computing system 18 accepts the multiple data manipulation operation list 17c for processing in order to determine data manipulation operations to be performed against the data in a data store.

Back end computing system 18 is used to retrieve multiple data manipulation operation list 17c and make changes to data located in data store 23 based on process commands generated from the multiple data manipulation operation list. Back end computing system 18 comprises a memory system 25 (e.g., an application server). Memory system 25 may comprise a single memory system (e.g., a single application server). Alternatively, memory system 25 may comprise a plurality of memory systems (e.g., multiple application servers). Memory system 25 comprises a multiple data manipulation (MDM) processing software application 19, an MDM list 17 (e.g., a multiple data manipulation list as described with reference to FIGS. 2 and 3, infra), a configuration data store 21, and a data store 23. Configuration data store 12 comprises configuration data used for processing MDM list 17c in order to modify the data located within data store 23 (i.e., as described with reference to FIG. 3, infra). Multiple data manipulation processing software application 16 is used to process MDM list 17c. The following process steps illustrate a multiple data manipulation operation processing process performed by back end computing system 18:

1. Back end computing system 18 receives (i.e., from front end computing system 10) MDM list 17c comprising data objects as described, supra.
2. Back end computing system 18 reviews a first data object of MDM list 17c.
3. All the data values of the first data object are stored in a first data object variable.
4. Back end computing system 18 reviews a new item attribute for the first data object variable to determine a first value.
5. Back end computing system 18 reviews an original/existing item attribute for the first data object variable to determine a second value.
6. Based on the first value and the second value, a specified operation/command (e.g., DELETE, ADD, REPLACE/UPDATE, etc) is performed to the data in data store. A REPLACE/UPDATE operation/command may be performed using different techniques in accordance with configuration data in configuration data store 23 as described in detail with respect to FIG. 3, infra.

The aforementioned processing steps are repeated for each data object on MDM list 17c. The following table 1 illustrates operation/commands associated with values (i.e., 0 represents a null value and 1 represents existing data) for the new item attribute and the original/existing item attribute:

TABLE 1

| Existing Item Attribute Value | New Item Attribute Value | MDM Operation/Command |
| --- | --- | --- |
| 0 | 1 | ADD |
| 1 | 0 | DELETE |
| 1 | 1 | UPDATE |

Figure 2A:
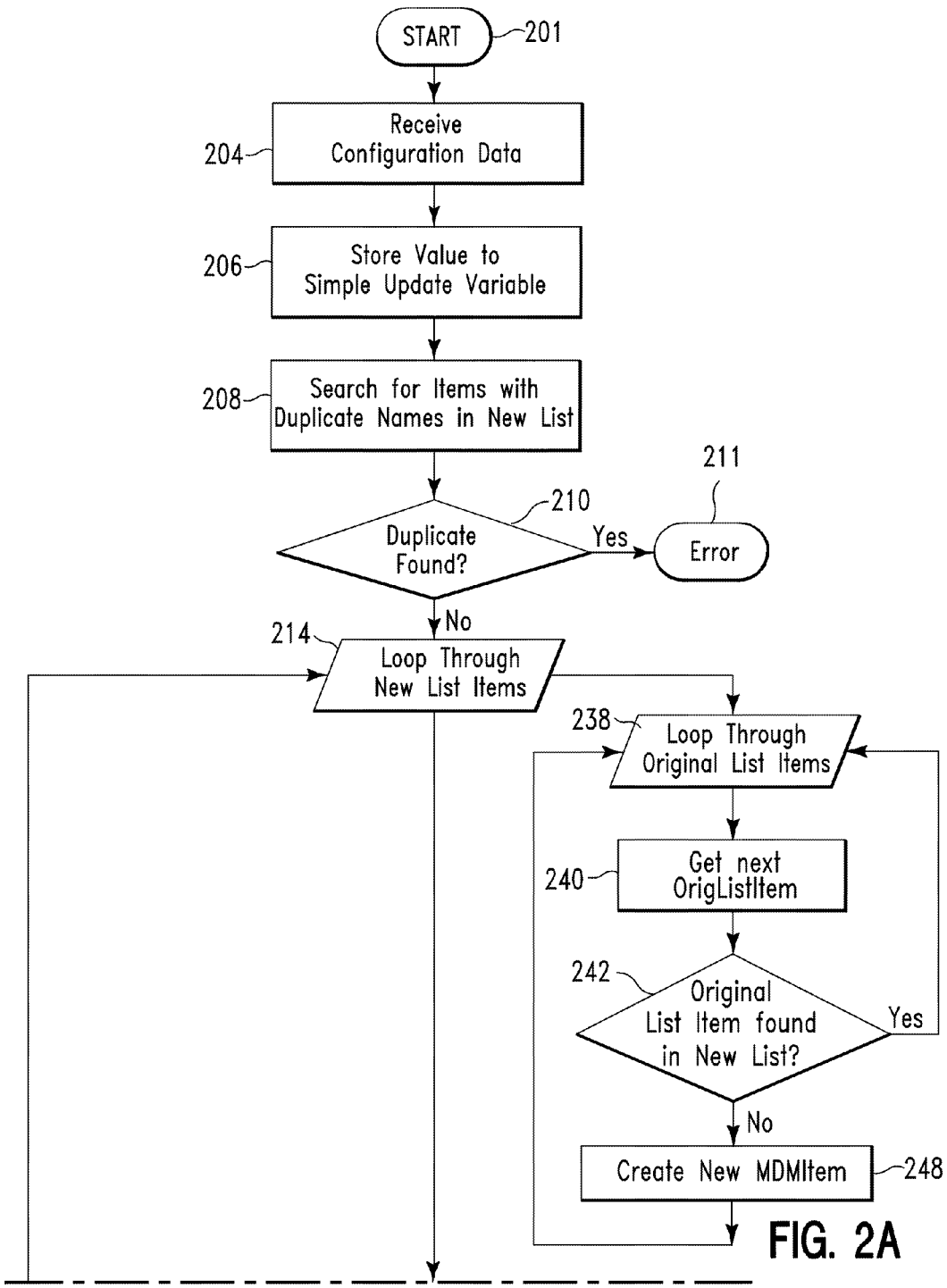
FIGS. 2A and 2B illustrates a flowchart describing an algorithm used by the system of FIG. 1 for generating multiple data manipulation operations, in accordance with embodiments of the present invention.
Figures 2, 2B:
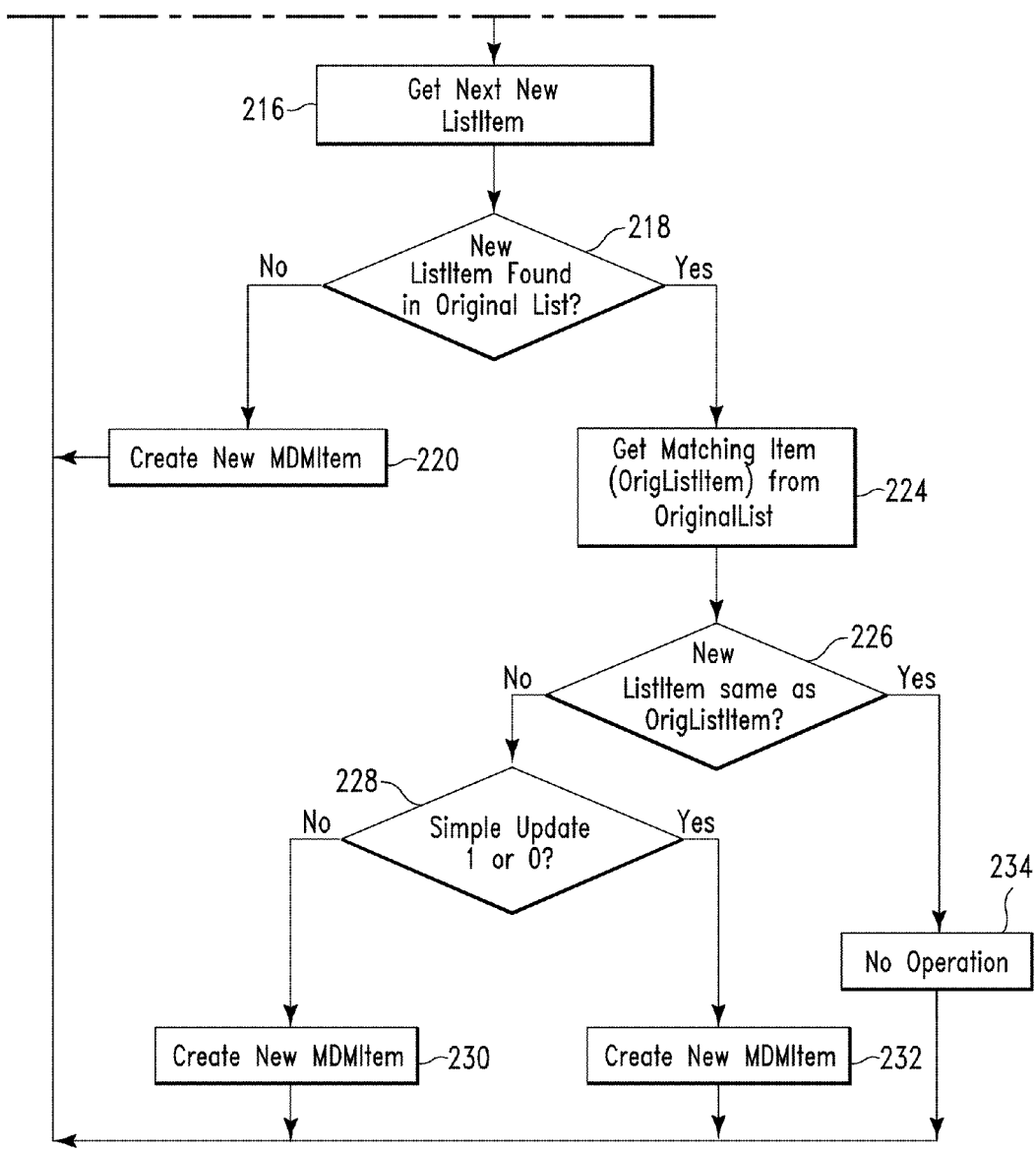
FIG. 2 which includes

FIG. 2 which includes FIGS. 2A and 2B illustrates a flowchart describing an algorithm used by system 5 of FIG. 1 for generating multiple data manipulation operations, in accordance with embodiments of the present invention. In step 201, the process is initiated. In step 204, a front end computing system (e.g., front end computing system 10 of FIG. 1) receives and stores configuration data. The configuration data may comprise a SimpleUpdate configuration setting value. In step 206, the SimpleUpdate configuration setting value is stored in a SimpleUpdate variable. In step 208, an original (i.e., first initial list) of data objects (i.e., items) is compared to a new (i.e., modified) list of items (i.e., modified by a user) to determine if any identifying attributes are equal. In step 210, it is determined if there are two items (i.e., from the original list and the new list) whose identifying attributes are equal (i.e., a duplicate found). If in step 210, it is determined that there are two items (i.e., from the original list and the new list) whose identifying attributes are equal then in step 211, an error message is generated and processing is terminated. The error message may be transmitted back to the user. If in step 210, it is determined if there are not two items (i.e., from the original list and the new list) whose identifying attributes are equal then in step 214, (i.e. starting at the first data object in the new list) continue to iterate through items in the new list until the end of the list is reached (i.e., loop through the items in the new list until there are no more items) and step 214 is executed (i.e., as described, infra). In step 216, a next item in the new list is retrieved and all the data (attribute) values of the next item are stored in a new list item variable. In step 218, it is determined if the identifying attribute (i.e., a name) of the new list item (data object) is found in the original list of items (data objects).

If in step 218, it is determined that the identifying attribute (i.e., a name) of the new list item (data object) is not found in the original list of items (data objects) then in step 220, (i.e., since the identifying attribute of this new list item data object was not found in the original list of data objects) an multiple data manipulation (MDM) data object (i.e., mdmItem), whose data (attribute) values will inform the process MDM object list to ADD this data item to a data store (i.e., in back end computing system 18) and step 214 is repeated. This mdmItem object will be populated as follows:

1. The identifying attribute (e.g., attrName) will be assigned the value of a name attribute from this NewListItem object.
2. An existingItem attribute will be assigned a null value.
3. A newItem attribute will be assigned all the data values of the NewListItem object.

If in step 218, it is determined that the identifying attribute (i.e., a name) of the new list item (data object) is found in the original list of items (data objects) then in step 224, an UPDATE operation will be performed. Since the identifying attribute of this NewListItem data object was found in the original list of data objects step 224 will find the matching item in the original list and populate the origListItem object with its data values. In step 226, it is determined if data values in the origListItem object are equal to data values in the NewListItem object. If in step 226, it is determined that the data values are the same then in step 234, no operation is performed and step 214 is repeated. If in step 226, it is determined that the data values are different, then in step 228, it is determined if a SimpleUpdate variable value is 1/true/yes or 0/false/no. If in step 228, it is determined that the SimpleUpdate variable value is 0/false/no then in step 230 a new mdmItem object is created and populated as follows:

1. An attrName will be assigned the value of the name attribute in this NewListItem.
2. The existing item attribute will be assigned all the data values of the original list item object.

3. The new item attribute will be assigned the reference to this NewListItem.

If in step 228, it is determined that the SimpleUpdate variable value is 1/true/yes then in step 232, a new mdmItem object is generated and populated it as follows:
1. An attrName will be assigned the value of the name attribute in this NewListItem.
2. The existing item attribute will be created with only the attributes that had been changed by the user. For example, it the item originally had three attributes, but the user only changed the value attribute, then this newItem attribute will only consist of the value attribute.

In step 238, (i.e., after the new list items have been processed for ADD and UPDATE operations), the original list is iterated to create a list of DELETE operations. The front end computing system loops through the items in the original list until there are no more items. The mdmItems created during the processing of this loop correspond to items in the original list that are not found in the new list. In step 238, (i.e., after the logic has iterated through all the original list items), DELETE operations are identified and corresponding items are added to the MDM list). In step 240, a next item in the original list is retrieved and all the data values of the next item are stored in an OriginalListItem variable. In step 242, it is determined if an identifying attribute of an originalListItem data object (e.g. a name attribute value) is found in the new list. If in step 242, it is determined that an identifying attribute of an originalListItem data object (e.g. a name attribute value) is found in the new list then step 238 is repeated. If in step 242, it is determined that an identifying attribute of an initialListItem data object (e.g. a name attribute value) is not found in the new list then in step 248, an MDM data object (i.e., the mdmItem) is generated. The MDM data object comprises data values will tell the Process MDM Object List to DELETE this data item from a data store. The mdmItem object will be populated as follows:
1. An attrName attribute will be assigned the value of the name attribute from the originalListItem object.
2. An existing item attribute will be assigned all the data values of the originalListItem object.
3. The new item attribute will be assigned a value of null.

FIG. 3 which includes FIGS. 3A and 3B illustrates a flowchart describing an algorithm used by system 5 of FIG. 1 for processing multiple data manipulation operations, in accordance with embodiments of the present invention. In step 301, the process is initiated. In step 304, a back end computing system (e.g., back end computing system 18 of FIG. 1) reads configuration data from a configuration data store. The configuration data may comprise a SimpleUpdate configuration setting value. In step 306, the SimpleUpdate configuration setting value is stored in a SimpleUpdate variable. In step 308, (i.e., starting at the first item on an MDM list (e.g., MDM list 17c of FIG. 1)), back end computing system 18 iterates through all data objects/items on the MDM list until an end of the MDM list is reached (i.e., as described by steps 310, 314, and 316). Note that in this loop DELETE operations will be performed. In step 310, a next data object/item in the MDM list is retrieved and all the data values of the next data object/item are stored in an MdmListItem variable. In step 314, it is determined if a new item attribute of the MdmListItem variable (i.e., from step 310) is null. If in step 314, it is determined that a new item attribute of the MdmListItem variable (i.e., from step 310) is not null then step 308 is repeated for a next data object/item in the MDM list. If in step 314, it is determined that a new item attribute of the MdmListItem variable (i.e., from step 310) is null then in step 316, a DELETE operation is performed on data in a data store (e.g., data store 23 in FIG. 1). The DELETE operation is applied to the data in the data store to delete data where the value of an identifying field in the data store is equal to the attrName attribute value of the MdmListItem. In step 318, (i.e., starting at the first item on the MDM list), back end computing system 18 iterates through all data objects/items on the MDM list until an end of the MDM list is reached (i.e., as described by steps 320 . . . 342). Note that in this loop the ADD and MODIFY operations will be performed. In step 320, a next data object/item in the MDM list is retrieved and all the data values of the next data object/item are stored in an MdmItem variable. In step 322, it is determined if an original/existing item attribute of the MdmListItem (i.e., from step 320) is null. If in step 322, it is determined that an original/existing item attribute of the MdmListItem (i.e., from step 320) is null then in step 342, an ADD operation is performed by requesting that the data in the newItem object found in the MdmItem object be added to the data store. If in step 322, it is determined that an original/existing item attribute of the MdmListItem (i.e., from step 320) is not null then in step 324, it is determined if a new item attribute of the MdmListItem is not null. If in step 324, it is determined that a new item attribute of the MdmListItem is null then step 318 is repeated. If in step 324, it is determined that a new item attribute of the MdmListItem is not null then step 318 it is determined if the SimpleUpdate variable (i.e., from step 306) equals 0/false/no or 1/true/yes. If in step 318 it is determined that the SimpleUpdate variable (i.e., from step 306) 1/true/yes then in step 334, an UPDATE request is submitted to the data store with the data values found in the newItem object of the MdmListItem where the value of the identifying field in the data store is equal to the attrName attribute of the MdmItem (and step 318 is repeated for a next data object). If in step 328, it is determined that the SimpleUpdate variable (i.e., from step 306) equals 0/false/no then in step 332, a DELETE request/operation is submitted to the data store. The value of the identifying field in the data store is equal to the attrName attribute of the MdmItem. In step 338, an ADD operation is performed by requesting that the data in the newItem object found in the MdmItem object is added to the data store. Perform the ADD operation by requesting that the data in the newItem object found in thisMdmItem object be added to the data store (and step 318 is repeated for a next data object).

Figure 4A:
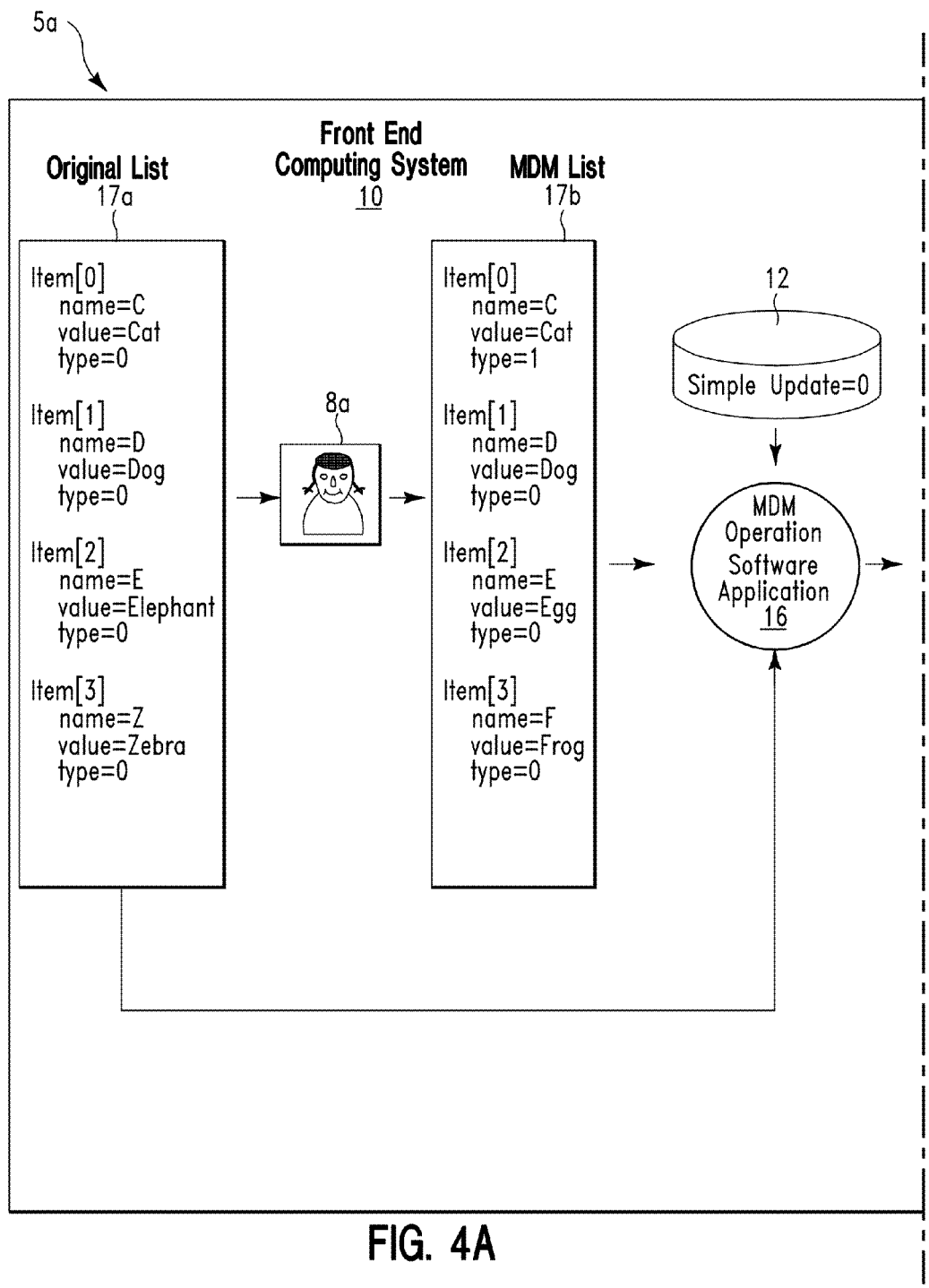

FIG. 4 which includes FIGS. 4A and 4B illustrates a component diagram describing a usage process for implementing the algorithms of FIGS. 2 and 3 for generating and processing multiple data manipulation operations, in accordance with embodiments of the present invention. The usage process is implemented by comparing an original list of data objects 17a to a new list of data objects 17b (i.e., the new list comprises the original list which has been modified by a user on front end system computing system 10) in order to generate an MDM list 17c. MDM list 17c will dictate a minimal set of data manipulation operations. System 5a retrieves all multiple data changes performed by the user on front end system computing system 10 and packages them into a single request (i.e., MDM list 17c) which backend computing system 18 may unpack and perform.

The following process steps illustrate a processing flow performed by system 5a for generating and processing minimal required multiple data manipulation operations:
1. An original list 17a of data objects is retrieved. There are four items on original list 17a of data objects. A first item (i.e., data object) on original list 17a is Item[0] which has three attributes. Each attribute comprises a name and a value. The name of a first attribute for Item[0] is name. A value of the first attribute for Item[0] is C. An alternative way for expressing this name and value for the first attribute for Item[0] is: name=C. The remaining two attributes of Item[0] are value=Cat and type=0. The remaining three attributes for the original list are as follows: Attributes for Item[1] are: name=D, value=Dog, type=0. Attributes for Item[2] are: name=E, value=Elephant, type=0. Attributes for Item[3] are: name=Z, value=Zebra, type=0.

2. A new list 17b of data objects is generated by a user 8a. New list 17b of data objects results from user 8a who starts with original list 17b and performs front-end data manipulation operations (e.g., updates to existing data items, deletes original data items, adds new data items, et c). User 8a performs these operations in a front-end software application such as, inter alia, a web browser. User 8a may remove a data item completely, update a data item by modifying an attribute, add a new data item new list 17b, or perform no operation. New list 17b comprises four data objects. A first data object, Item[0] comprises three attributes, name=C, value=Cat, type=1. Note that user 8a changed the type attribute value from original list 16a from 0 to 1. A second data object, Item[1] comprises three attributes, name=D, value=Dog, and type=0. This data object is identical to the data object in original list 17a whose identity attribute, name, has the value of D. The attributes of a third data object, Item[2] comprises name-E, value=Egg, and type=0. The value attribute was changed in original list 17a from Elephant to Egg. A fourth data object, Item[3] comprises three attributes: name=F, value=Frog, and type=0. There is no data object in original list 17a who's identifying attribute and name comprises a value of F. Therefore, this is a new attribute which will ultimately result in an Add operation.

3. Front end system computing system 10 (i.e., MDM operation software application 16) generates (i.e., in response to user 8a command) a multiple data manipulation (MDM) list 17c. The data objects (i.e., items) on MDM list 17c represent the minimal data manipulation operations that have been determined by MDM operation software application 16 based on changes between original list 17a and new list 17b. MDM operation software application 16 aggregates all data manipulation request to be performed on backend computing system 18. There are four data objects MDM list 17c of data objects. A first MDM item MdmItem [0] comprises attributes: attrName=C, existingItem which is a data object, whose attributes are: value=Cat, and type=0. MdmItem[0]'s third attribute is also a data object: newItem, whose attributes are: value=Cat and type=1. This mdm data item, MdmItem[0] has data in both the existingItem and newItem attributes, which MDM operation software application 16 will interpret as an UPDATE operation. A second mdm item comprises MdmItem[1], whose attributes are as follows: attrName=E, existingItem: value=Elephant, type=0, newItem: type=Egg, type=0. This mdm item additionally comprises data in both the existingItem and newItem attributes, which MDM operation software application 16 will interpret as an UPDATE operation. A third mdm item comprises MdmItem[2], whose attributes are as follows: attrName=F, existingItem=null, newItem: value=Frog, type=0. Since the existingItem is null, MDM operation software application 16 will interpret this as an ADD operation. A fourth mdm item is MdmItem [3], whose attributes are as follows: attrName=Z, existingItem: value=Zebra, type=0, newItem=null. Since the newItem attribute is null, MDM operation software application 16 will interpret this as a DELETE operation.

4. MDM operation software application 16 retrieves configuration data from configuration data store 12 in order to retrieve a SimpleUpdate configuration setting. If SimpleUpdate configuration setting equals zero (or false) then MDM operation software application 16 will populate MDM list 17c with a full set of attributes so that the back end computing system 18 comprises enough information to perform a DELETE and an ADD (which requires all the full set of attributes) command. If SimpleUpdate configuration setting equals 1 (or true) then MDM operation software application 16 will only add changes to the attributes of the existingItem attribute object and the newItem attribute object as it builds MDM list 17c.

5. Front end system computing system 10 transmits MDM list 17c to backend computing system 18 for processing.

6. Configuration data store 12a comprises configuration data used by MDM object processing software application 19 in order to retrieve a SimpleUpdate configuration setting. If the SimpleUpdate configuration setting equals zero (or false) then MDM object processing software application 19 will perform a DELETE and then an ADD operation. If the SimpleUpdate configuration setting equals 1 (or true) then MDM object processing software application 19 will perform a single UPDATE operation.

7. MDM object processing software application 19 retrieves MDM list 17c as input and generates data manipulation operations to either ADD, DELETE or MODIFY data in data store 23. Data store 23 comprises the data from which original list 17a was created and which will store the results of the data manipulation operations that are generated by MDM object processing software application 19. In this example, the data record/object whose identifying field has a value of C will have its value field updated with the value of Cat and its type field updated with the value of 1. Similarly, the data record/object in data store 23 whose identifying field has a value of E will be updated with a value of Egg and its type field updated with a value of 0. Note that all of the attributes are included in MDM items. This allows the flexibility of performing a single UPDATE operation or slightly modifying the MDM object processing software application 19 in order to perform a DELETE command followed by an ADD command to accomplish the same goal of updating the data object with the changes. MDM object processing software application 19 will add a record/object to data store 23 whose identifying field has a value of F, whose value field has a value of Frog, and whose type field has a value of 0. MDM object processing software application 19 will delete the record/object from data store 23 whose identifying field has a value of Z.

Figure 5:
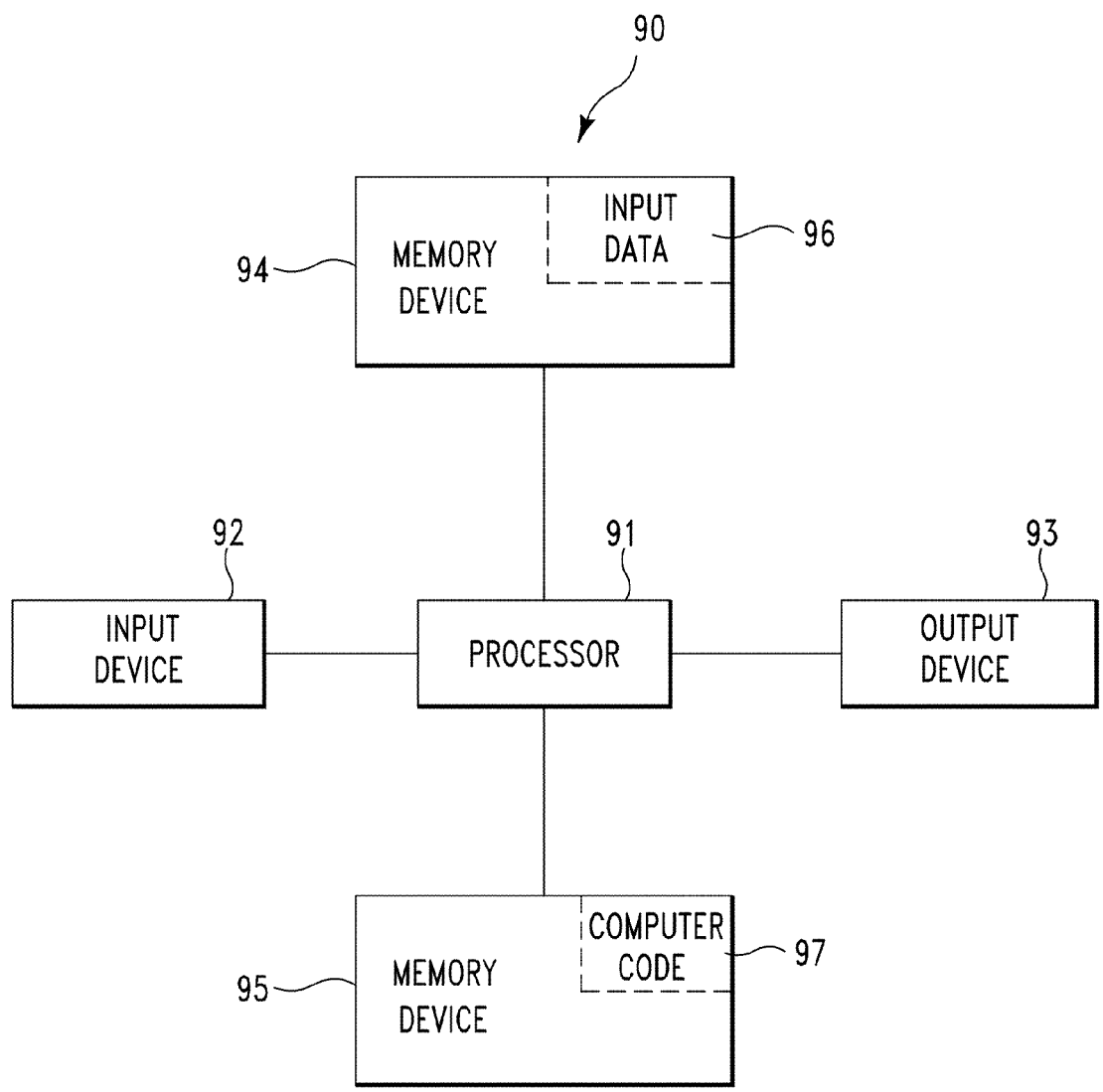
FIG. 5 illustrates a computer apparatus used for generating and processing multiple data manipulation operations, in accordance with embodiments of the present invention.

FIG. 5 illustrates a computer apparatus 90 (e.g., front end computing system 10 or back end computing system 18 of FIG. 1) used for generating and processing multiple data manipulation operations, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for generating and processing multiple data manipulation operations. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to generate and process multiple data manipulation operations. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating and processing multiple data manipulation operations. In another embodiment, the invention provides a business method that performs the process steps of the invention on a subscription, advertising, and/or fee basis. That is, a service provider, such as a Solution Integrator, could offer to generate and process multiple data manipulation operations. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data manipulation method comprising:
receiving, by a computing system, a multiple data manipulation (MDM) list, wherein said computing system comprises a memory system, wherein said memory system comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;
generating, by said computing system, an operation table for storing attribute values and associated commands;
reviewing, by said computing system, a first data object of said data objects;
storing, by said computing system, all attribute values of said first data object in a first data object variable;
determining, by said computing system, that a new item attribute for said first data object variable comprises an attribute value of null;
storing, by said computing system in said operation table, said new item attribute for said first data object variable;
determining, by said computing system, that an original item attribute for said first data object variable comprises an attribute value of not null;
storing, by said computing system in said operation table, said original item attribute for said first data object variable;
generating, by said computing system, a first DELETE request command;
storing, by said computing system in said operation table, said first DELETE request command;
reviewing, by said computing system, a second data object of said data objects;
storing, by said computing system, all attribute values of said second data object in a second data object variable;
determining, by said computing system, that a new item attribute for said second data object variable comprises an attribute value of not null;
storing, by said computing system in said operation table, said new item attribute for said second data object variable;
determining, by said computing system, that an original item attribute for said second data object variable comprises an attribute value of null;
storing, by said computing system in said operation table, said original item attribute for said second data object variable;
generating, by said computing system, an ADD request command;
storing, by said computing system in said operation table, said first ADD request command;
reviewing, by said computing system, a second data object of said data objects;
storing, by said computing system, all attribute values of said second data object in a second data object variable;
determining, by said computing system, that an additional new item attribute for said second data object variable comprises an attribute value of not null;
storing, by said computing system in said operation table, said additional new item attribute for said second data object variable;
determining, by said computing system, that an additional original item attribute for said second data object variable comprises an attribute value of not null;
storing, by said computing system in said operation table, said additional original item attribute for said second data object variable;
generating, by said computing system, an UPDATE request command;
storing, by said computing system in said operation table, said first UPDATE request command; and
executing, by said computing system, said operation table with respect to said MDM list, wherein said executing results in:

transmitting, by said computing system, said first DELETE request command to said memory system;
deleting in response to first delete request command, by said computing system, a first portion of said data, wherein said first portion of data is associated with a first name attribute comprised by said first data object variable;
transmitting, by said computing system, said ADD request command to said memory system; and
adding in response to said ADD request command, by said computing system, replacement data to said data, wherein said replacement data is associated with second data object variable;
transmitting, by said computing system, said UPDATE request command to said memory system; and
updating in response to said UPDATE request command, by said computing system, said data, wherein said updating comprises replacing a second portion of said data with replacement data associated with said second data object variable.

2. The method of claim 1, wherein said method further comprises:
receiving, by said computing system, configuration data, wherein said configuration data comprises an update configuration data value; and
storing said configuration data in said memory system.

3. The method of claim 2, wherein said method further comprises:
reviewing, by said computing system, a third data object of said data objects;
storing, by said computing system, all attribute values of said third data object in a third data object variable;
determining, by said computing system, that a new item attribute for said third data object variable comprises an attribute value of not null;
determining, by said computing system, that an original item attribute for said third data object variable comprises an attribute value of not null;
determining, by said computing system, that said configuration data comprises an update configuration data value of 1/true/yes;
generating, by said computing system, an additional UPDATE request command;
transmitting, by said computing system, said additional UPDATE request command to said memory system; and
additionally updating in response to said additional UPDATE request command, by said computing system, said data, wherein said additionally updating comprises replacing a third portion of said data with additional replacement data associated with said third data object variable.

4. The method of claim 2, wherein said method further comprises:
reviewing, by said computing system, a third data object of said data objects;
storing, by said computing system, all attribute values of said third data object in a third data object variable;
determining, by said computing system, that a new item attribute for said third data object variable comprises an attribute value of not null;
determining, by said computing system, that an original item attribute for said third data object variable comprises an attribute value of not null;
determining, by said computing system, that said configuration data comprises an update configuration data value of 0/false/no;
generating, by said computing system, a second DELETE request command;
generating, by said computing system, an additional ADD request command;
transmitting, by said computing system, said second DELETE request command to said memory system;
deleting in response to second DELETE request command, by said computing system, a third portion of said data, wherein said third portion of data is associated with a second name attribute comprised by said third data object variable;
transmitting, by said computing system, said additional ADD request command to said memory system; and
adding in response to said additional ADD request command, by said computing system, additional replacement data to said data, wherein said additional replacement data is associated with third data object variable.

5. A computing system comprising a processor coupled to a computer-readable memory unit, said memory unit comprising instructions that when executed by the processor implements a data manipulation method, said method comprising:
receiving, by said computing system, a multiple data manipulation (MDM) list, wherein said memory unit comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;
generating, by said computing system, an operation table for storing attribute values and associated commands;
reviewing, by said computing system, a first data object of said data objects;
storing, by said computing system, all attribute values of said first data object in a first data object variable;
determining, by said computing system, that a new item attribute for said first data object variable comprises an attribute value of null;
storing, by said computing system in said operation table, said new item attribute for said first data object variable;
determining, by said computing system, that an original item attribute for said first data object variable comprises an attribute value of not null;
storing, by said computing system in said operation table, said original item attribute for said first data object variable;
generating, by said computing system, a first DELETE request command;
storing, by said computing system in said operation table, said first DELETE request command;
reviewing, by said computing system, a second data object of said data objects;
storing, by said computing system, all attribute values of said second data object in a second data object variable;
determining, by said computing system, that a new item attribute for said second data object variable comprises an attribute value of not null;
storing, by said computing system in said operation table, said new item attribute for said second data object variable;

determining, by said computing system, that an original item attribute for said second data object variable comprises an attribute value of null;

storing, by said computing system in said operation table, said original item attribute for said second data object variable;

generating, by said computing system, an ADD request command;

storing, by said computing system in said operation table, said first ADD request command;

reviewing, by said computing system, a second data object of said data objects;

storing, by said computing system, all attribute values of said second data object in a second data object variable;

determining, by said computing system, that an additional new item attribute for said second data object variable comprises an attribute value of not null;

storing, by said computing system in said operation table, said additional new item attribute for said second data object variable;

determining, by said computing system, that an additional original item attribute for said second data object variable comprises an attribute value of not null;

storing, by said computing system in said operation table, said additional original item attribute for said second data object variable;

generating, by said computing system, an UPDATE request command;

storing, by said computing system in said operation table, said first UPDATE request command; and executing, by said computing system, said operation table with respect to said MDM list, wherein said executing results in:

transmitting, by said computing system, said first DELETE request command to said memory system;

deleting in response to first delete request command, by said computing system, a first portion of said data, wherein said first portion of data is associated with a first name attribute comprised by said first data object variable;

transmitting, by said computing system, said ADD request command to said memory system; and adding in response to said ADD request command, by said computing system, replacement data to said data, wherein said replacement data is associated with second data object variable;

transmitting, by said computing system, said UPDATE request command to said memory system; and updating in response to said UPDATE request command, by said computing system, said data, wherein said updating comprises replacing a second portion of said data with replacement data associated with said second data object variable.

6. The computing system of claim 5, wherein said method further comprises:

receiving, by said computing system, configuration data, wherein said configuration data comprises an update configuration data value; and storing said configuration data in said memory unit.

7. The computing system of claim 6, wherein said method further comprises:

reviewing, by said computing system, a third data object of said data objects;

storing, by said computing system, all attribute values of said third second data object in a third data object variable;

determining, by said computing system, that a new item attribute for said third data object variable comprises an attribute value of not null;

determining, by said computing system, that an original item attribute for said third data object variable comprises an attribute value of not null;

determining, by said computing system, that said configuration data comprises an update configuration data value of 1/true/yes;

generating, by said computing system, an additional UPDATE request command;

transmitting, by said computing system, said additional UPDATE request command to said memory system; and additionally updating in response to said additional UPDATE request command, by said computing system, said data, wherein said additionally updating comprises replacing a third portion of said data with additional replacement data associated with said third data object variable.

8. The computing system of claim 6, wherein said method further comprises:

reviewing, by said computing system, a third data object of said data objects;

storing, by said computing system, all attribute values of said third data object in a third data object variable;

determining, by said computing system, that a new item attribute for said third data object variable comprises an attribute value of not null;

determining, by said computing system, that an original item attribute for said third data object variable comprises an attribute value of not null;

determining, by said computing system, that said configuration data comprises an update configuration data value of 0/false/no;

generating, by said computing system, a second DELETE request command;

generating, by said computing system, an additional ADD request command;

transmitting, by said computing system, said second DELETE request command to said memory system;

deleting in response to second DELETE request command, by said computing system, a third portion of said data, wherein said third portion of data is associated with a second name attribute comprised by said third data object variable;

transmitting, by said computing system, said additional ADD request command to said memory system; and adding in response to said additional ADD request command, by said computing system, additional replacement data to said data, wherein said additional replacement data is associated with third data object variable.

9. A computer program product, comprising a computer readable storage device storing a computer readable program code embodied therein, said computer readable program code comprising an algorithm that when executed by a computer processor of a computing system implements a data manipulation method within said computing system comprising said computer readable storage device, said method comprising:

receiving, by said computing system, a multiple data manipulation (MDM) list, wherein said computer readable medium comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;

generating, by said computing system, an operation table for storing attribute values and associated commands;

reviewing, by said computing system, a first data object of said data objects;

storing, by said computing system, all attribute values of said first data object in a first data object variable;

determining, by said computing system, that a new item attribute for said first data object variable comprises an attribute value of null;

storing, by said computing system in said operation table, said new item attribute for said first data object variable;

determining, by said computing system, that an original item attribute for said first data object variable comprises an attribute value of not null;

storing, by said computing system in said operation table, said original item attribute for said first data object variable;

generating, by said computing system, a first DELETE request command;

storing, by said computing system in said operation table, said first DELETE request command;

reviewing, by said computing system, a second data object of said data objects;

storing, by said computing system, all attribute values of said second data object in a second data object variable;

determining, by said computing system, that a new item attribute for said second data object variable comprises an attribute value of not null;

storing, by said computing system in said operation table, said new item attribute for said second data object variable;

determining, by said computing system, that an original item attribute for said second data object variable comprises an attribute value of null;

storing, by said computing system in said operation table, said original item attribute for said second data object variable;

generating, by said computing system, an ADD request command;

storing, by said computing system in said operation table, said first ADD request command;

reviewing, by said computing system, a second data object of said data objects;

storing, by said computing system, all attribute values of said second data object in a second data object variable;

determining, by said computing system, that an additional new item attribute for said second data object variable comprises an attribute value of not null;

storing, by said computing system in said operation table, said additional new item attribute for said second data object variable;

determining, by said computing system, that an additional original item attribute for said second data object variable comprises an attribute value of not null;

storing, by said computing system in said operation table, said additional original item attribute for said second data object variable;

generating, by said computing system, an UPDATE request command;

storing, by said computing system in said operation table, said first UPDATE request command; and executing, by said computing system, said operation table with respect to said MDM list, wherein said executing results in:

transmitting, by said computing system, said first DELETE request command to said memory system;

deleting in response to first delete request command, by said computing system, a first portion of said data, wherein said first portion of data is associated with a first name attribute comprised by said first data object variable;

transmitting, by said computing system, said ADD request command to said memory system; and adding in response to said ADD request command, by said computing system, replacement data to said data, wherein said replacement data is associated with second data object variable;

transmitting, by said computing system, said UPDATE request command to said memory system; and updating in response to said UPDATE request command, by said computing system, said data, wherein said updating comprises replacing a second portion of said data with replacement data associated with said second data object variable.

10. The computer program product of claim 9, wherein said method further comprises:

receiving, by said computing system, configuration data, wherein said configuration data comprises an update configuration data value; and storing said configuration data in said computer readable medium.

11. The computer program product of claim 10, wherein said method further comprises:

reviewing, by said computing system, a third data object of said data objects;

storing, by said computing system, all attribute values of said third data object in a third data object variable;

determining, by said computing system, that a new item attribute for said third data object variable comprises an attribute value of not null;

determining, by said computing system, that an original item attribute for said third data object variable comprises an attribute value of not null;

determining, by said computing system, that said configuration data comprises an update configuration data value of 1/true/yes;

generating, by said computing system, an additional UPDATE request command;

transmitting, by said computing system, said additional UPDATE request command to said memory system; and additionally updating in response to said additional UPDATE request command, by said computing system, said data, wherein said additionally updating comprises replacing a third portion of said data with additional replacement data associated with said third data object variable.

12. The computer program product of claim 10, wherein said method further comprises:

reviewing, by said computing system, a third data object of said data objects;

storing, by said computing system, all attribute values of said third data object in a third data object variable;

determining, by said computing system, that a new item attribute for said third data object variable comprises an attribute value of not null;

determining, by said computing system, that an original item attribute for said third data object variable comprises an attribute value of not null;

determining, by said computing system, that said configuration data comprises an update configuration data value of 0/false/no;
generating, by said computing system, a second DELETE request command;
generating, by said computing system, an additional ADD request command;
transmitting, by said computing system, said second DELETE request command to said memory system;
deleting in response to second DELETE request command, by said computing system, a third portion of said data, wherein said third portion of data is associated with a name attribute comprised by said third data object variable;
transmitting, by said computing system, said additional ADD request command to said memory system; and
adding in response to said additional ADD request command, by said computing system, additional replacement data to said data, wherein said additional replacement data is associated with third data object variable.

13. A process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing a data manipulation method, said method comprising:
receiving, by said computing system, a multiple data manipulation (MDM) list, wherein said memory unit comprises data, wherein said MDM list is associated with an original list of data objects and a new list of data objects, wherein said new list comprises a modified version of said original list, wherein said MDM list comprises data objects, wherein each data object of said data objects comprises original item attributes associated with said original list and new item attributes associated with said new list, wherein each attribute of said original item attributes comprises an attribute value, and wherein each attribute of said new item attributes comprises an attribute value;
generating, by said computing system, an operation table for storing attribute values and associated commands;
reviewing, by said computing system, a first data object of said data objects;
storing, by said computing system, all attribute values of said first data object in a first data object variable;
determining, by said computing system, that a new item attribute for said first data object variable comprises an attribute value of null;
storing, by said computing system in said operation table, said new item attribute for said first data object variable;
determining, by said computing system, that an original item attribute for said first data object variable comprises an attribute value of not null;
storing, by said computing system in said operation table, said original item attribute for said first data object variable;
generating, by said computing system, a first DELETE request command;
storing, by said computing system in said operation table, said first DELETE request command;
reviewing, by said computing system, a second data object of said data objects;
storing, by said computing system, all attribute values of said second data object in a second data object variable;
determining, by said computing system, that a new item attribute for said second data object variable comprises an attribute value of not null;
storing, by said computing system in said operation table, said new item attribute for said second data object variable;
determining, by said computing system, that an original item attribute for said second data object variable comprises an attribute value of null;
storing, by said computing system in said operation table, said original item attribute for said second data object variable;
generating, by said computing system, an ADD request command;
storing, by said computing system in said operation table, said first ADD request command;
reviewing, by said computing system, a second data object of said data objects;
storing, by said computing system, all attribute values of said second data object in a second data object variable;
determining, by said computing system, that an additional new item attribute for said second data object variable comprises an attribute value of not null;
storing, by said computing system in said operation table, said additional new item attribute for said second data object variable;
determining, by said computing system, that an additional original item attribute for said second data object variable comprises an attribute value of not null;
storing, by said computing system in said operation table, said additional original item attribute for said second data object variable;
generating, by said computing system, an UPDATE request command;
storing, by said computing system in said operation table, said first UPDATE request command; and
executing, by said computing system, said operation table with respect to said MDM list, wherein said executing results in:
transmitting, by said computing system, said first DELETE request command to said memory system;
deleting in response to first delete request command, by said computing system, a first portion of said data, wherein said first portion of data is associated with a first name attribute comprised by said first data object variable;
transmitting, by said computing system, said ADD request command to said memory system; and
adding in response to said ADD request command, by said computing system, replacement data to said data, wherein said replacement data is associated with second data object variable;
transmitting, by said computing system, said UPDATE request command to said memory system; and
updating in response to said UPDATE request command, by said computing system, said data, wherein said updating comprises replacing a second portion of said data with replacement data associated with said second data object variable.

14. The process of claim 13, wherein said method further comprises:
receiving, by said computing system, configuration data, wherein said configuration data comprises an update configuration data value; and
storing said configuration data in said memory unit.

15. The process of claim 14, wherein said method further comprises:

reviewing, by said computing system, a third data object of said data objects;

storing, by said computing system, all attribute values of said third data object in a third data object variable;

determining, by said computing system, that a new item attribute for said third data object variable comprises an attribute value of not null;

determining, by said computing system, that an original item attribute for said third data object variable comprises an attribute value of not null;

determining, by said computing system, that said configuration data comprises an update configuration data value of 1/true/yes;

generating, by said computing system, an additional UPDATE request command;

transmitting, by said computing system, said additional UPDATE request command to said memory system; and additionally updating in response to said additional UPDATE request command, by said computing system, said data, wherein said additionally updating comprises replacing a third portion of said data with additional replacement data associated with said third data object variable.

16. The process of claim 14, wherein said method further comprises:

reviewing, by said computing system, a third data object of said data objects;

storing, by said computing system, all attribute values of said third data object in a third data object variable;

determining, by said computing system, that a new item attribute for said third data object variable comprises an attribute value of not null;

determining, by said computing system, that an original item attribute for said third data object variable comprises an attribute value of not null;

determining, by said computing system, that said configuration data comprises an update configuration data value of 0/false/no;

generating, by said computing system, a second DELETE request command;

generating, by said computing system, an additional ADD request command;

transmitting, by said computing system, said second DELETE request command to said memory system;

deleting in response to second DELETE request command, by said computing system, a third portion of said data, wherein said third portion of data is associated with a second name attribute comprised by said third data object variable;

transmitting, by said computing system, said additional ADD request command to said memory system; and adding in response to said additional ADD request command, by said computing system, additional replacement data to said data, wherein said additional replacement data is associated with third data object variable.

* * * * *